US012358295B2

(12) United States Patent
Ideta et al.

(10) Patent No.: US 12,358,295 B2
(45) Date of Patent: Jul. 15, 2025

(54) LIQUID EJECTION APPARATUS

(71) Applicant: CANON KABUSHIKI KAISHA, Tokyo (JP)

(72) Inventors: Satoshi Ideta, Kanagawa (JP); Kyosuke Toda, Kanagawa (JP); Shimpei Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 18/470,293

(22) Filed: Sep. 19, 2023

(65) Prior Publication Data

US 2024/0100852 A1 Mar. 28, 2024

(30) Foreign Application Priority Data

Sep. 22, 2022 (JP) ................................ 2022-151393
Jun. 27, 2023 (JP) ................................ 2023-104674

(51) Int. Cl.
*B41J 2/175* (2006.01)
*F15D 1/04* (2006.01)

(52) U.S. Cl.
CPC ....... *B41J 2/17556* (2013.01); *B41J 2/17596* (2013.01); *F15D 1/04* (2013.01)

(58) Field of Classification Search
CPC .... B41J 2/175; B41J 2/17506; B41J 2/17509; B41J 2/17513; B41J 2/1752; B41J 2/17523; B41J 2/17556; B41J 2/17596; B41J 29/13
See application file for complete search history.

(56) References Cited

U.S. PATENT DOCUMENTS 5,087,930 A * 2/1992 Roy ......................... B41J 2/155 347/85
2012/0281044 A1* 11/2012 Andrews .............. B41J 2/14233 347/40

FOREIGN PATENT DOCUMENTS

JP 6578888 B2 9/2019

* cited by examiner

*Primary Examiner* — Anh T Vo
(74) *Attorney, Agent, or Firm* — Canon U.S.A., Inc. IP Division

(57) ABSTRACT

A liquid ejection apparatus includes an ejection head that ejects a liquid, a container that stores the liquid, and a reservoir that supplies the liquid to the ejection head and stores the liquid supplied from the container. The reservoir includes a first chamber that stores the liquid, a second chamber that is arranged downstream of the first chamber and stores the liquid, and a first flow path and a second flow path that communicate the first and second chambers with each other. A communication port between the first chamber and the second flow path is located lower than a communication port between the first chamber and the first flow path in a usage posture of the liquid ejection apparatus. The second flow path is configured so that a rate of a pressure loss increases as a flow rate of the liquid flowing inside the second flow path increases.

17 Claims, 15 Drawing Sheets

LIQUID EJECTION APPARATUS

BACKGROUND

Field of the Disclosure

The present disclosure relates to a liquid ejection apparatus.

Description of the Related Art

As a type of liquid ejection apparatus, ink-jet printers are known to perform recording (printing) by ejecting ink as a liquid to a medium from an ejection port of an ejection head. Such ink-jet printers include the ejection head for ejecting ink and a supply path for supplying a liquid stored in a container to the ejection head. Some of the ink-jet printers further include a reservoir configured to temporarily store a certain amount of liquid and connected to the ejection head. In a case where an ink-jet printer with such a configuration performs recording, a liquid is supplied to the ejection head not only from the container but also from the reservoir connected to and located near the ejection head, so that print blurring can be prevented at the time of recording with a large flow rate or at the start of recording.

Japanese Patent No. 6578888 discusses a liquid ejection apparatus including a reservoir that includes a first storage chamber capable of storing ink as a liquid, a second storage chamber arranged on a supply path side upstream of the first storage chamber and capable of storing ink, an upper supply path communicating the first storage chamber and the second storage chamber with each other, and a lower supply path communicating the first storage chamber and the second storage chamber with each other below the upper supply path. In the reservoir discussed in Japanese Patent No. 6578888, if suction is performed from an ink discharge port of the first storage chamber, ink flows into the second storage chamber from the supply path. In a case where the suction is performed at a relatively large flow rate, a pressure loss in the lower supply path increases, so that a part of the ink flowing into the second storage chamber does not flow into the first storage chamber, and the second storage chamber is filled with the ink. If the suction is stopped, the ink moves from the second storage chamber to the first storage chamber. On the other hand, in a case where an ink flow rate in the reservoir is relatively small at the time of recording, the pressure loss in the lower supply path is smaller in proportion to the flow rate, so that the ink flows from the second storage chamber to the first storage chamber and is supplied to the ejection head. At the time of recording, the ink that fills the first and second storage chambers and located near the ejection head is supplied to the ejection head, so that it is possible to suppress print blurring at the time of recording with a large flow rate or at the start of recording.

In the reservoir discussed in Japanese Patent No. 6578888, if the pressure loss in the lower supply path is not large enough at the time of filling the second storage chamber with a liquid, a large amount of ink also flows into the first storage chamber on the downstream side. The liquid flowing into the first storage chamber at this time is discharged from the ejection head as waste ink. If the pressure loss in the lower supply path is designed to be large, ink is not supplied from the second storage chamber during recording, so that the amount of ink supplied to the ejection head may be insufficient, resulting in an ejection failure, and a printed image may be blurred. As described above, the magnitude of the pressure loss in the lower supply path affects reduction of a waste ink amount in filling and suppression of blurring in a printed image, and these two are in a trade-off relationship.

SUMMARY

The present disclosure generally provides for a liquid ejection apparatus that achieves both reduction of a waste ink amount in liquid filling and suppression of blurring in recording.

According to an aspect of the present disclosure, a liquid ejection apparatus includes an ejection head configured to eject a liquid, a container configured to store the liquid, and a reservoir configured to supply the liquid to the ejection head and to store the liquid supplied from the container. The reservoir includes a first liquid chamber configured to store the liquid, a second liquid chamber configured to store the liquid and arranged on a downstream side of the first liquid chamber, the downstream side being closer to the ejection head, and a first communication flow path and a second communication flow path that communicate the first liquid chamber and the second liquid chamber with each other. A communication port between the first liquid chamber and the second communication flow path is located lower than a communication port between the first liquid chamber and the first communication flow path in a usage posture of the liquid ejection apparatus. The second communication flow path is configured so that a rate of a pressure loss increases as a flow rate of the liquid flowing inside the second communication flow path increases.

Further features of the present disclosure will become apparent from the following description of embodiments with reference to the attached drawings.

DESCRIPTION OF THE EMBODIMENTS

Figure 1:
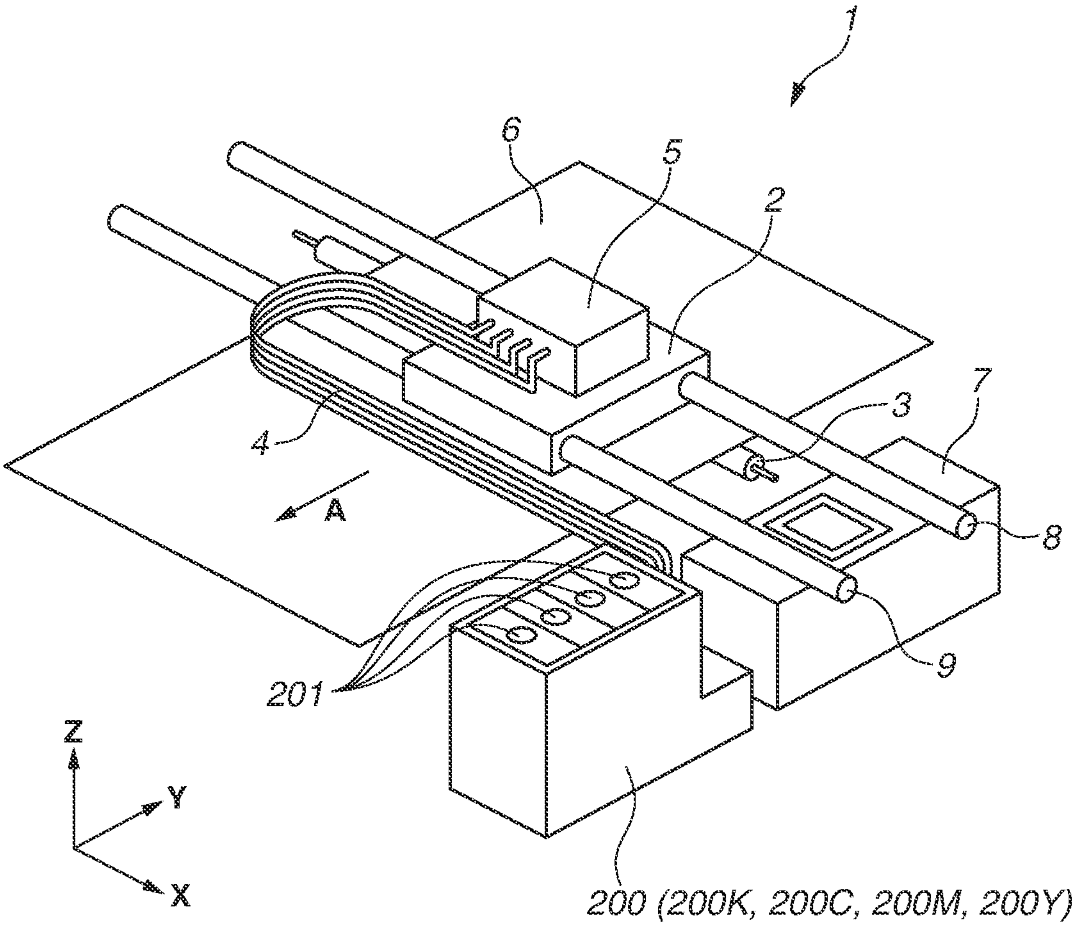
FIG. 1 is a diagram illustrating an example of a liquid ejection apparatus according to an embodiment of the present disclosure.

FIG. 1 is a perspective diagram illustrating main parts of an ink-jet printer 1 as an example of a liquid ejection apparatus to which an embodiment of the present disclosure can be applied. The ink-jet printer 1 performs recording on a medium 6 by ejecting ink as a liquid from an ejection head 5 to the medium 6 while alternately moving the ejection head 5 in a main scanning direction (an X direction) and the medium 6 in a sub-scanning direction A orthogonal to the main scanning direction. In FIG. 1, a Z direction is a vertically upward direction, the X direction is a width direction of the medium 6, and a Y direction is a direction opposite to a conveyance direction (the sub-scanning direction A) of the medium 6.

The ink-jet printer 1 includes a carriage 2 that mounts the ejection head 5 thereon and reciprocates, a conveyance roller 3 that conveys the medium 6, containers 200 that store a liquid, and a tube 4 that connects the containers 200 and the ejection head 5. The ink-jet printer 1 further includes a first shaft 8 and a second shaft 9 that guide the moving carriage 2, and a cap unit 7 for capping the ejection head 5. While a liquid is not ejected from the ejection head 5, the ejection head 5 stands by at the position of the cap unit 7 in a state where a nozzle portion of the ejection head 5 is sealed with a cap provided in the cap unit 7. The containers 200 each include a replenishment port 201 so that the containers 200 can be directly replenished with a liquid.

Figure 2:
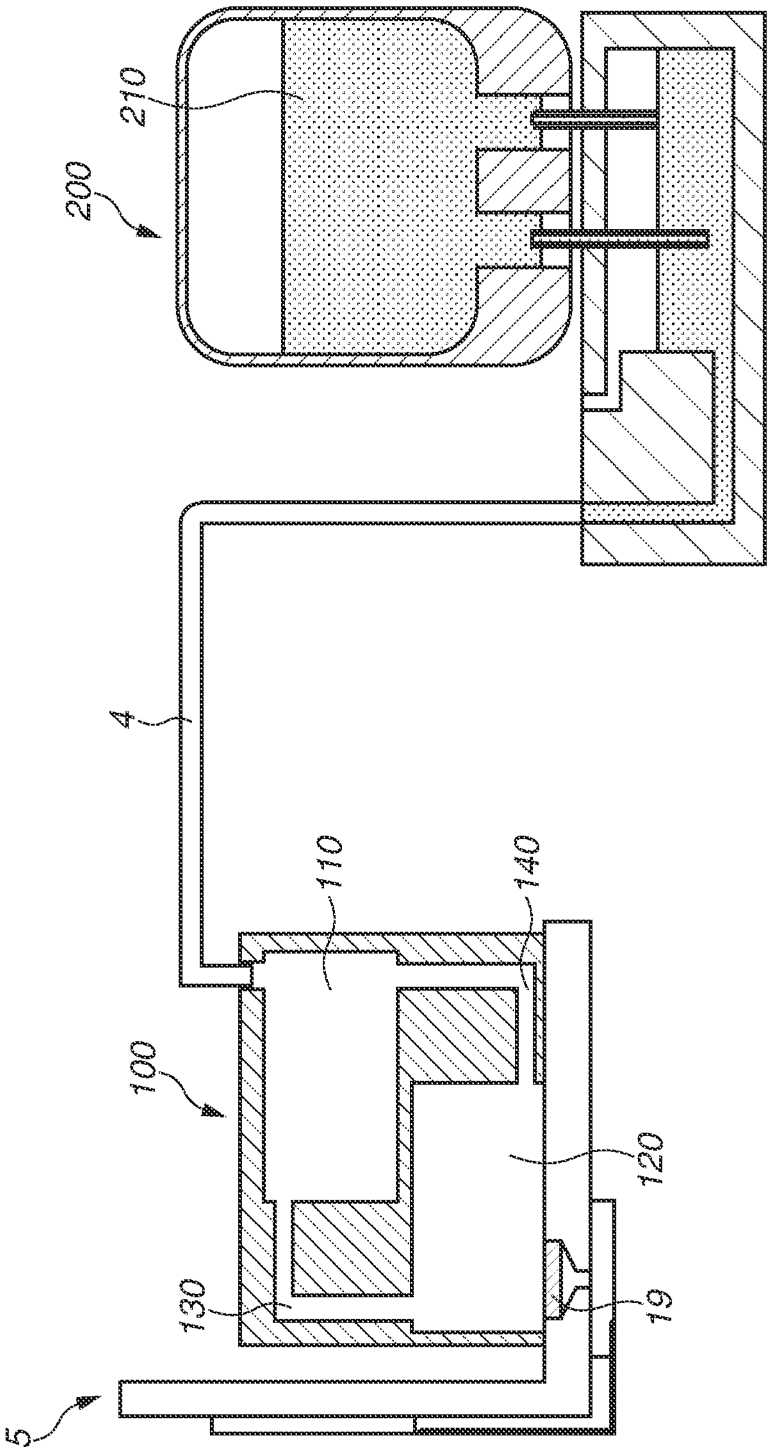
FIG. 2 is a schematic cross-sectional diagram illustrating an example of the liquid ejection apparatus according to the embodiment.

FIG. 2 is a schematic cross-sectional diagram illustrating a liquid flow path in the ink-jet printer 1. The liquid stored in the containers 200 is first supplied to reservoirs 100 connected to the ejection head 5 through the tube 4. The liquid is then supplied from the reservoirs 100 to the ejection head 5 through a filter 19, so that the liquid is ejected (printing is performed) onto the medium 6. In the present embodiment, the tube 4, the reservoirs 100, and the filter 19 form a supply path for supplying the ink stored in the containers 200 to the ejection head 5. FIG. 2 illustrates a state immediately after ink 210 is supplied from the containers 200 to the tube 4. The reservoirs 100 connected to the ejection head 5 are configured to reciprocate in a predetermined direction together with the ejection head 5. The reservoirs 100, which are connected to the ejection head 5 and are closer to the ejection head 5 than the containers 200, store a certain amount of liquid, so that the reservoirs 100 exert an effect of preventing print blurring on the medium 6 at the time of recording with a large flow rate or at the start of recording. A detailed structure of the reservoirs 100 will be described below.

Figure 3:
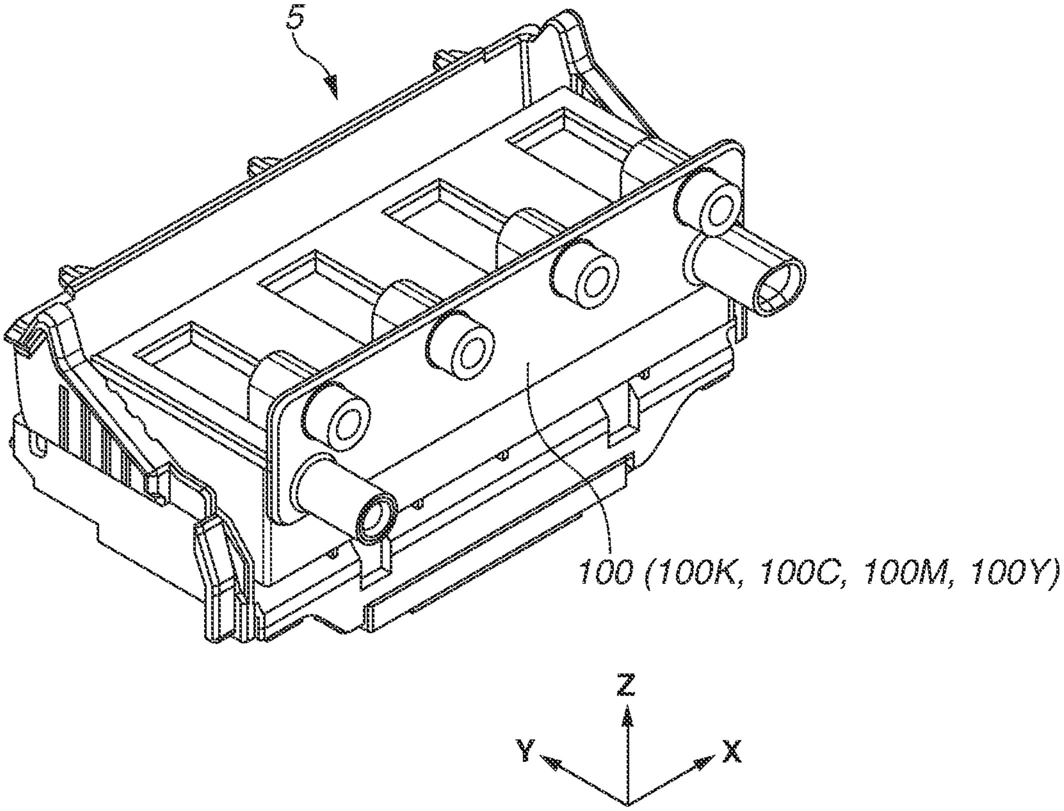
FIG. 3 is a perspective diagram illustrating an example of an ejection head and an example of a reservoir according to the embodiment.
Figure 4A:
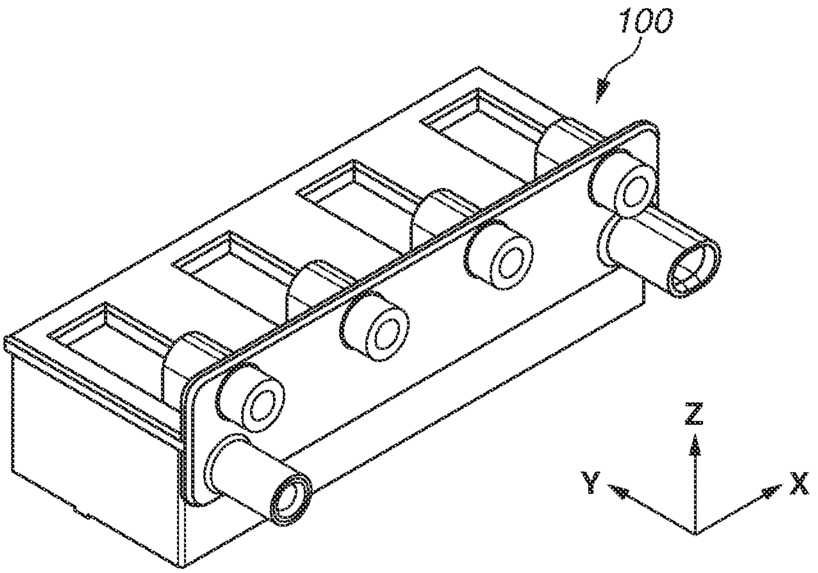
FIGS. 4A and 4B are diagrams each illustrating an example of the reservoir according to the embodiment.
Figure 4B:
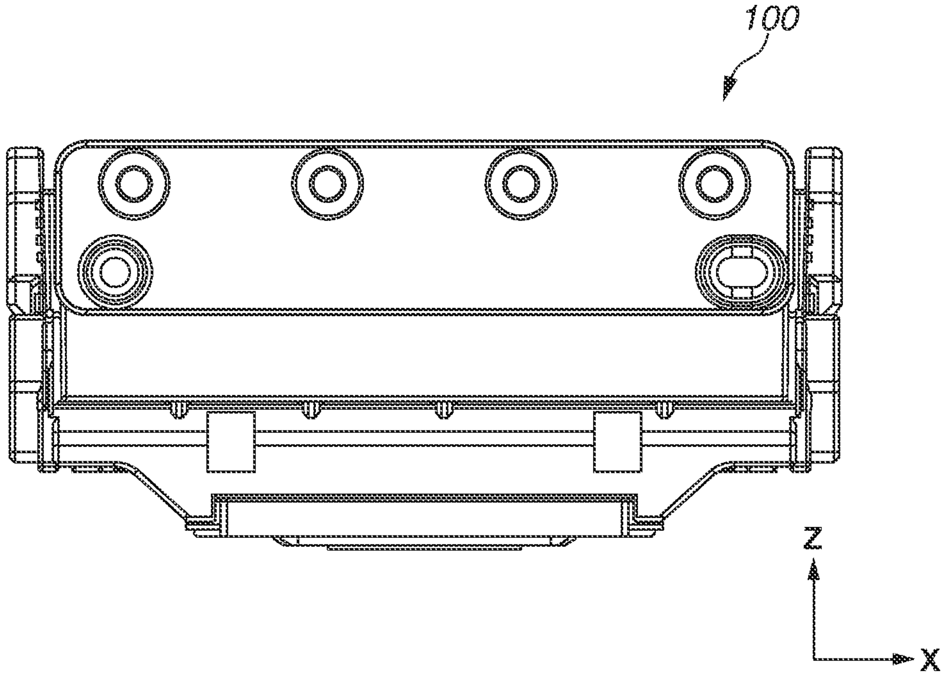

FIG. 3 is a perspective diagram of the ejection head 5 connected to the reservoirs 100. FIG. 4A is a perspective diagram of the reservoirs 100. FIG. 4B illustrates the reservoirs 100 on an X-Z plane. In the present embodiment, four types of ink (black, cyan, magenta, and yellow) to be ejected from the ejection head 5 are respectively stored in four containers 200 (200K, 200C, 200M, and 200Y, see FIG. 1) and four reservoirs 100 (100K, 100C, 100M, and 100Y) as an example. In the present embodiment, the ink-jet printer 1 uses four ink colors, but the number of ink colors to be used is not limited to four. The ink-jet printer 1 may use a plurality of ink colors other than four ink colors or use only a single ink color. The ink-jet printer 1 may also eject a liquid other than ink, such as a reaction liquid.

As described above, the ink-jet printer 1 includes therein the cap unit 7 for capping the ejection head 5. The cap unit 7 includes a suction pump (not illustrated). The suction pump is operated in a state where the nozzle portion of the ejection head 5 is sealed with the cap to perform suction inside the cap. In other words, the suction pump can perform a suction operation of suctioning the inside of the ejection head 5 from the outside. The suction operation enables the ink-jet printer 1 to perform initial filling of ink into the ejection head 5 and the reservoirs 100, and perform a discharge operation of suctioning and discharging ink from the nozzle portion.

Next, a configuration of the reservoirs 100 will be described in detail.

As illustrated in FIG. 2, the reservoirs 100 each include a first liquid chamber 110 that is located on an upstream side in an ink flow direction and communicates with the tube 4, a second liquid chamber 120 that is located on the ejection head 5 side, which is a downstream side in the ink flow direction, and communicates with the ejection head 5, and a first communication flow path 130 and a second communication flow path 140 that communicate the first liquid chamber 110 and the second liquid chamber 120 with each other. A communication port between the first liquid chamber 110 and the second communication flow path 140 is located lower than a communication port between the first liquid chamber 110 and the first communication flow path 130 in a usage posture of the liquid ejection apparatus.

Figure 5:
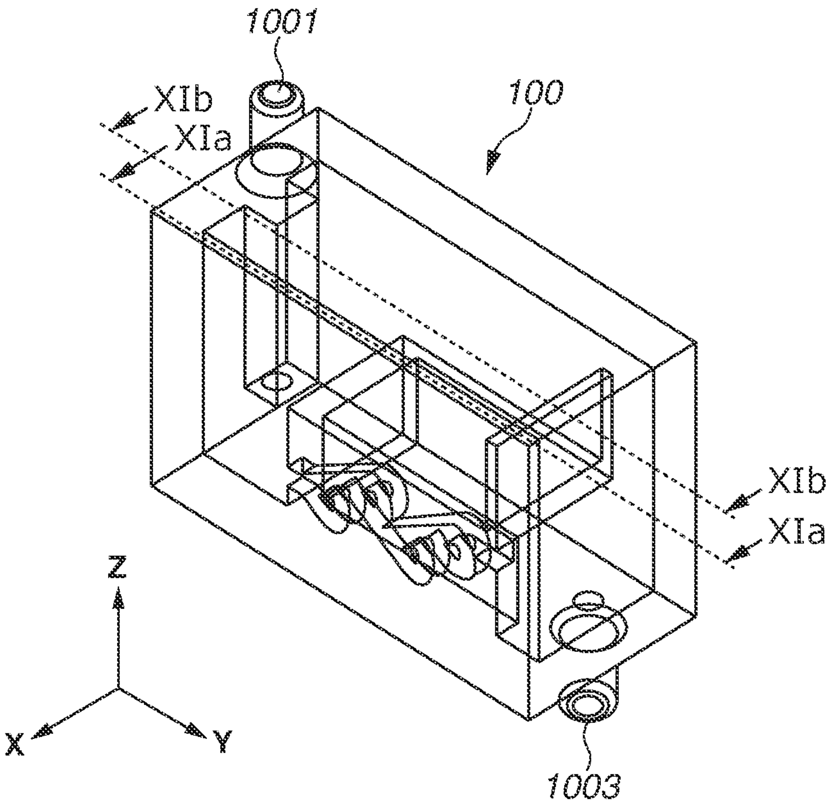
FIG. 5 is a perspective diagram illustrating an example of the reservoir according to the embodiment.
Figure 6A:
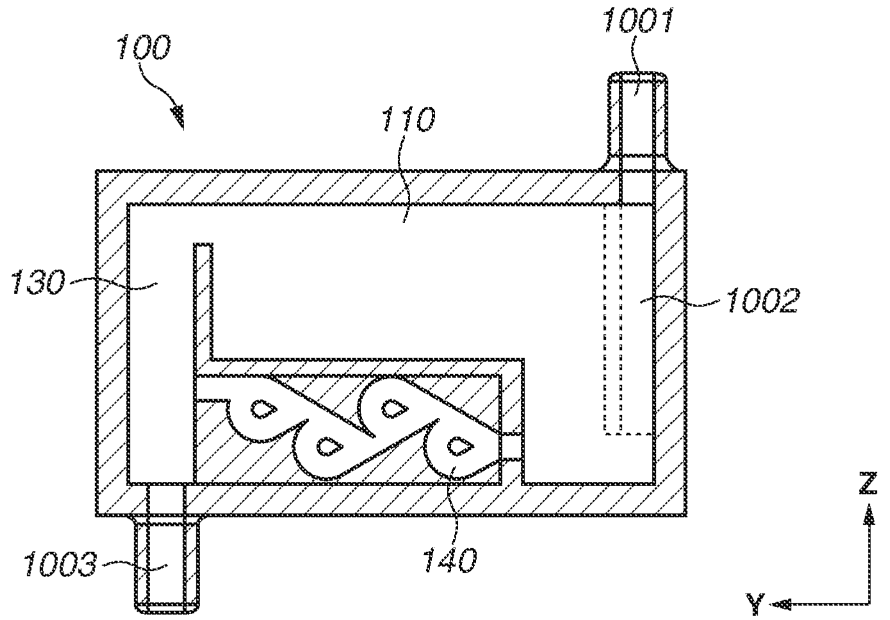
FIGS. 6A and 6B are cross-sectional diagrams of the reservoir respectively taken along a line XIa-XIa and a line XIb-XIb in FIG. 5.
Figure 6B:
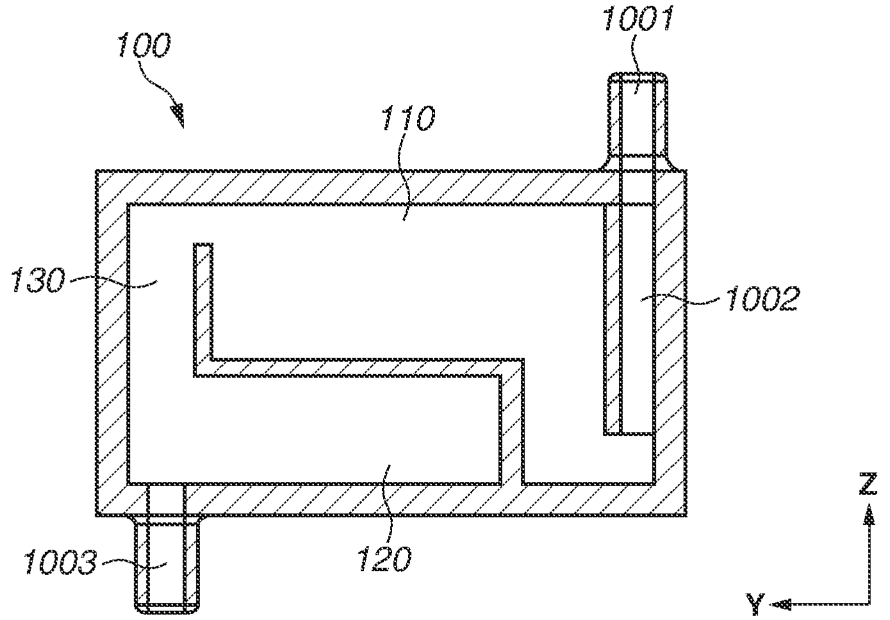

FIG. 5 is a perspective diagram of the reservoir 100 configured to store one color of ink. In FIG. 5, an internal structure of the reservoir 100 is also illustrated by solid lines. FIG. 6A is a Y-Z cross-sectional diagram of the reservoir 100 at a position overlapping the second communication flow path 140 along a line XIa-XIa in FIG. 5. FIG. 6B is a Y-Z cross-sectional diagram of the reservoir 100 at a position overlapping the second liquid chamber 120 along a line XIb-XIb in FIG. 5.

In the examples of the reservoir 100 illustrated in FIGS. 5, 6A, and 6B, the first liquid chamber 110 includes an introduction port 1001 and an introduction path 1002. Ink supplied from the tube 4 passes through the introduction port 1001 and then is supplied to the first liquid chamber 110 through the introduction path 1002. In FIG. 6A, the position of the introduction path 1002 existing in a depth direction is indicated by dotted lines. A discharge port 1003 is provided in the second liquid chamber 120 and is connected to the ejection head 5 through the filter 19 (see FIG. 2).

The second liquid chamber 120 and the second communication flow path 140 are arranged in a short-side direction in a horizontal direction, more specifically, in a direction substantially orthogonal (second orthogonal direction) to a liquid ejection direction. In other words, the second liquid chamber 120 and the second communication flow path 140 are arranged at positions overlapping each other in the X direction. With this arrangement, an effect of miniaturizing the reservoir 100 can be obtained compared with a case where all the liquid chambers and flow paths are arranged in the same plane, i.e., in a Y-Z plane as illustrated in FIG. 2. However, a positional relationship between the second liquid chamber 120 and the second communication flow path 140 is not limited thereto. For example, the second liquid chamber 120 and the second communication flow path 140 may be arranged to overlap each other in the Z direction. Regarding a positional relationship between the first liquid chamber 110 and the second liquid chamber 120, in FIG. 5, the second liquid chamber 120 is located vertically below the first liquid chamber 110. However, the positional relationship is not limited thereto. For example, the first liquid chamber 110 and the second liquid chamber 120 may be arranged side by side in the horizontal direction or may be in any other positional relationship.

In FIG. 5, the second communication flow path 140 has a shape extending in the direction substantially orthogonal (first orthogonal direction) to the liquid ejection direction, i.e., in the horizontal direction. Accordingly, it is possible to obtain an effect of easily supplying ink to the ejection head 5 without interruption even if an ink level in the second liquid chamber 120 decreases during recording.

Next, an action of the reservoir 100 and ideal behavior of ink in the reservoir 100 will be described. FIGS. 7 to 10 are schematic diagrams illustrating the behavior of ink in the reservoir 100, and correspond to the cross-sectional diagram of the example of the reservoir 100 illustrated in FIG. 6A. Dotted lines in FIGS. 7 to 10 indicate the position of the introduction path 1002 in the reservoir 100.

Figure 7:
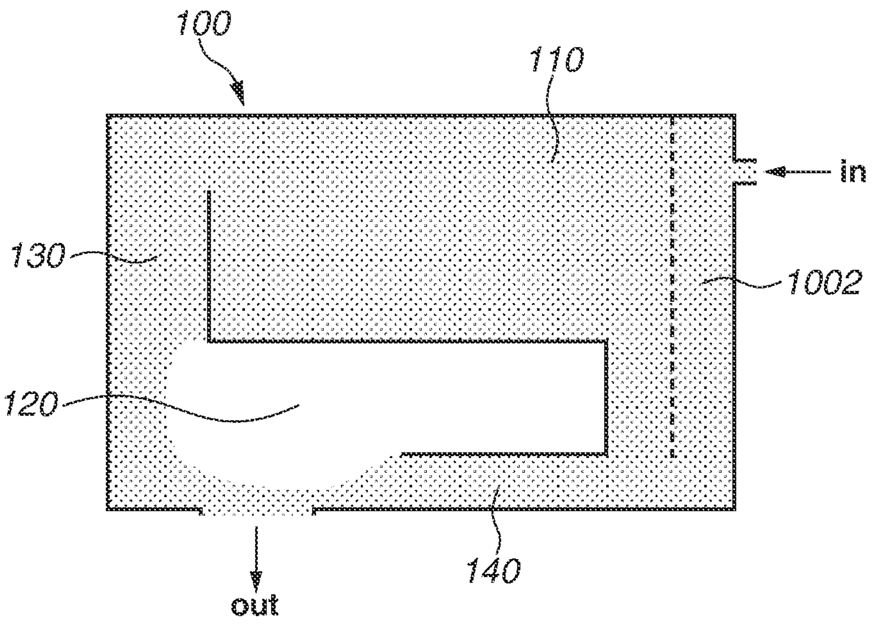
FIG. 7 is a diagram illustrating a state of the reservoir according to the embodiment at the time of liquid filling.

At the time of filling, as illustrated in FIG. 7, ink is suctioned from the ejection head 5 side, and the ink supplied from the introduction port 1001 fills the first liquid chamber 110 (which is referred to as a filling process). An ink flow rate at the time of filling (hereinafter referred to as a filling flow rate) is greater than a flow rate at the time of recording (hereinafter referred to as a recording flow rate), and a pressure loss in the second communication flow path 140 is relatively large at the time of filling. Thus, most of the ink supplied from the introduction path 1002 is stored in the first liquid chamber 110 instead of the second communication flow path 140 and the second liquid chamber 120.

Figure 8:
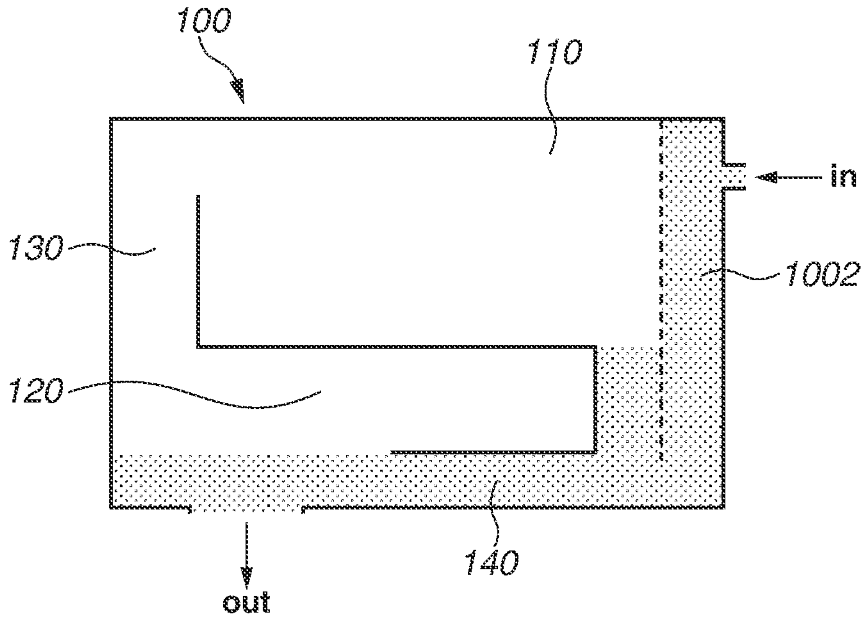
FIG. 8 is a diagram illustrating a state of the reservoir according to the embodiment at the time of recording.

On the other hand, the recording flow rate at the time of recording (hereinafter also referred to as an ejection process) is less than the filling flow rate, and the pressure loss in the second communication flow path 140 is relatively small at the time of recording. Thus, as illustrated in FIG. 8, the ink stored in the first liquid chamber 110 and the ink supplied from the introduction port 1001 are ejected from the ejection head 5 through the second communication flow path 140.

Next, an issue will be described while referring to a comparative example of the present disclosure. As the comparative example, the reservoir 100 is considered in which the second communication flow path 140 is a straight pipe and which does not have the characteristic of the present embodiment (described below) that the rate of the pressure loss in the second communication flow path 140 increases as the flow rate of the liquid flowing inside the second communication flow path 140 increases.

Figure 9:
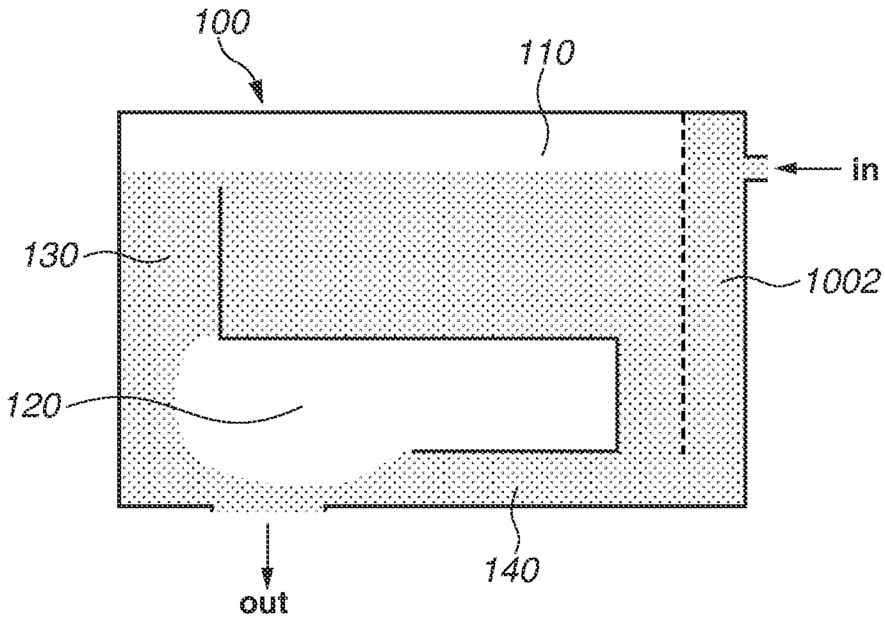
FIG. 9 is a diagram illustrating a state of a reservoir according to a comparative example at the time of liquid filling.

FIG. 9 illustrates an internal state of the reservoir 100 in a case where the pressure loss in the second communication flow path 140 is excessively small at the filling flow rate. If the pressure loss in the second communication flow path 140 is excessively small, the ink flows to the second liquid chamber 120 side through the second communication flow path 140 in which the pressure loss is small, unlike the state illustrated in FIG. 7. Thus, the first liquid chamber 110 is not filled with the ink, and all the ink supplied from the container 200 to the reservoir 100 is discharged from the ejection head 5 as waste ink.

Figure 10:
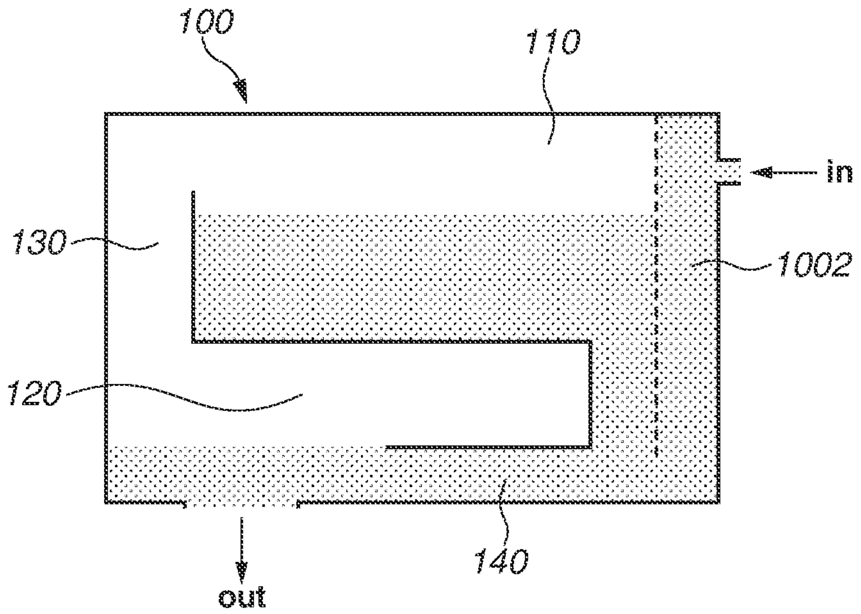
FIG. 10 is a diagram illustrating a state of the reservoir according to the comparative example at the time of recording.

FIG. 10 is a schematic diagram illustrating ink in the reservoir 100 in a case where the pressure loss in the second communication flow path 140 is excessively large at the recording flow rate. In a case where the pressure loss in the second communication flow path 140 is excessively large, unlike the state illustrated in FIG. 8 described above, the amount of ink passing through the second communication flow path 140 is very small even at the recording flow rate smaller than the filling flow rate, and most of the ink is filled into the first liquid chamber 110. If the amount of ink ejected from the ejection head 5 exceeds the amount of ink supplied to the second liquid chamber 120 through the second communication flow path 140, the ink supply to the ejection head 5 cannot keep up with the recording, causing print blurring. Thus, the pressure loss in the second communication flow path 140 is to be kept small enough to prevent disruption of the ink supply to the second liquid chamber 120 at an expected recording flow rate.

Figure 11A:
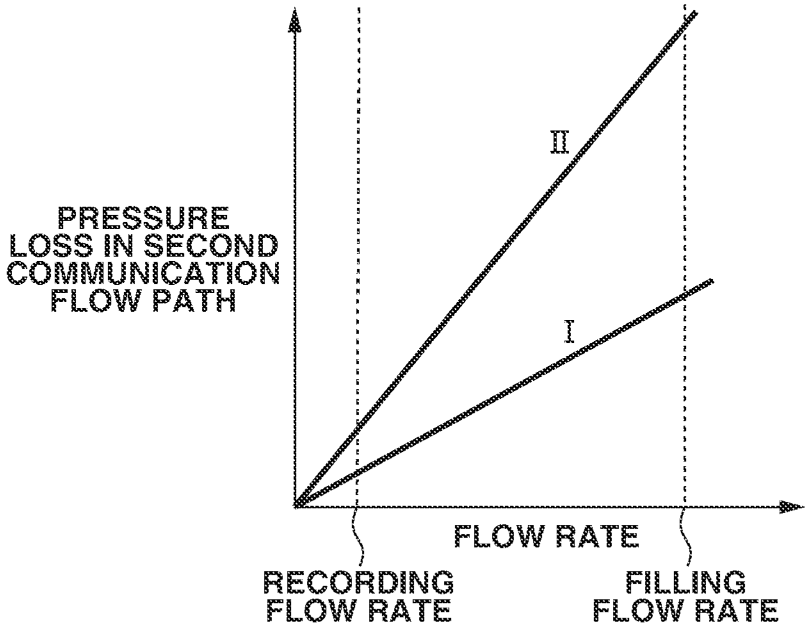
FIGS. 11A and 11B are diagrams respectively illustrating a pressure loss in a second communication flow path with respect to a liquid flow rate according to the comparative example and according to the embodiment.

FIG. 11A illustrates the pressure loss in the second communication flow path 140 with respect to the flow rate according to the comparative example in which the second communication flow path 140 is the straight pipe. As described above, the second communication flow path 140 is desirably designed so that the pressure loss in the second communication flow path 140 is small at the recording flow rate. However, in this case, the amount of waste ink may increase at the filling flow rate (see a line I in FIG. 11A). Conversely, if the second communication flow path 140 is designed to increase the pressure loss, the amount of waste ink at the filling flow rate is reduced, but the ink supply to the second liquid chamber 120 is disrupted at the recording flow rate, and a printed image may be blurred (see a line II in FIG. 11A). As described above, there is a trade-off relationship between reduction of the waste ink amount in filling and suppression of blurring in recording.

Figure 11B:
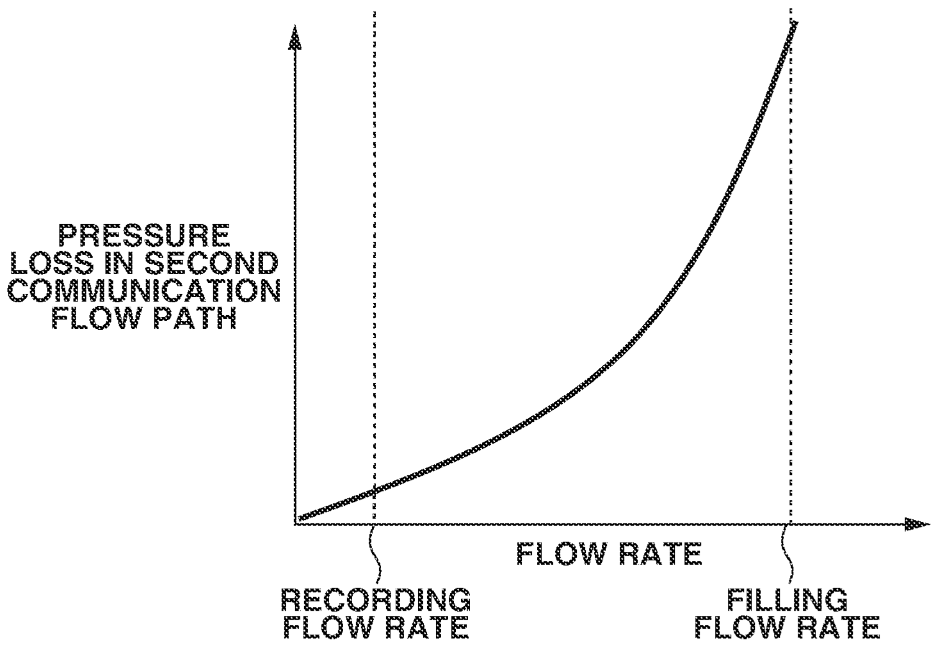

To address this issue, the reservoir 100 according to the present embodiment has the characteristic that the rate of the pressure loss in the second communication flow path 140 increases as the flow rate of ink flowing inside the second communication flow path 140 increases. In this case, a correlation between the pressure loss and the flow rate in the second communication flow path 140 has a downwardly convex shape as illustrated in FIG. 11B. In this case, the pressure loss in the second communication flow path 140 can be reduced at the recording flow rate and can be increased at the filling flow rate, whereby it is possible to reduce the waste ink amount in ink filling while suppressing blurring in recording.

As illustrated in FIG. 11B, the pressure loss in the second communication flow path 140 according to the present embodiment increases as the flow rate increases, and the rate of the pressure loss also increases as the flow rate increases. In the comparative example in which the second communication flow path 140 is the straight pipe, the pressure loss in the second communication flow path 140 increases in proportion to the flow rate, whereas the pressure loss in the second communication flow path 140 according to the present embodiment exponentially increases with respect to the flow rate. Thus, at the recording flow rate, which is a relatively small flow rate, the pressure loss in the second communication flow path 140 can be made small enough to prevent print blurring, and at the filling flow rate greater than the recording flow rate, the pressure loss in the second communication flow path 140 can be made large enough to minimize the waste ink amount. If the relationship between the pressure loss in the second communication flow path 140 and the ink flow rate, such as that illustrated in FIG. 11B, is established within a range of the ink flow rate, including the recording flow rate and the filling flow rate, for the ink (the liquid) used in the ink-jet printer 1 (the liquid ejection apparatus), the effect of the present embodiment can be obtained.

To achieve both the reduction of the waste ink amount in filling and the suppression of blurring in recording at a high level, it is desirable that the magnitude ratio of the pressure loss in the second communication flow path 140 at the filling flow rate to the pressure loss in the second communication flow path 140 at the recording flow rate be 2 times or more and 100 times or less. The magnitude ratio is more desirably 8 times or more and 100 times or less, and even more desirably 20 times or more and 100 times or less.

Figure 12A:
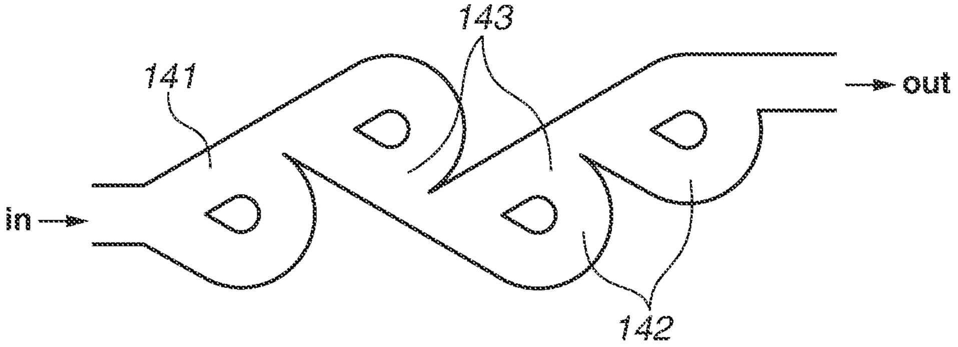
FIGS. 12A to 12C are diagrams illustrating an example of the second communication flow path according to the embodiment.
Figure 12B:
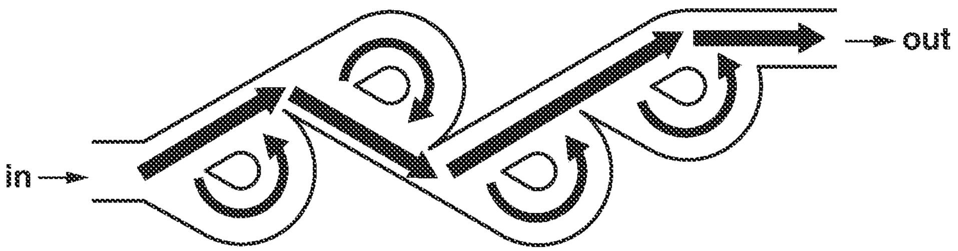
Figure 12C:
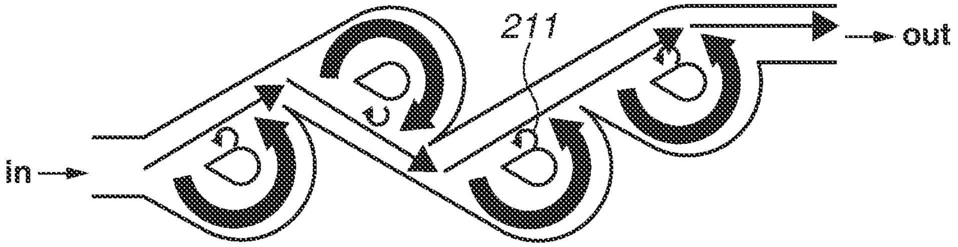

Next, a shape of the second communication flow path 140 in the reservoir 100 according to the present embodiment will be described. An example of the second communication flow path 140 is a flow path having a shape including a main flow path 141 and a sub flow path 142 that branches from the main flow path 141 and then joins the main flow path 141 on a downstream side in a liquid flow direction as illustrated in FIG. 12A. At a confluence portion 143 where the sub flow path 142 joins the main flow path 141, the sub flow path 142 is connected to the main flow path 141 in a direction perpendicular to the main flow path 141 or in a direction that hinders the flow of ink in the main flow path 141. More specifically, the sub flow path 142 has a loop shape with respect to the main flow path 141. FIGS. 12B and 12C are schematic diagrams respectively illustrating the ink flows in a case where the flow rate is small and in a case where the flow rate is large, and directions and sizes of arrows in FIGS. 12B and 12C indicate flow directions and flow rates of the ink. In a case where the flow rate of the ink flowing in the second communication flow path 140 is small, the ink flows through both the main flow path 141 and the sub flow path 142 as illustrated in FIG. 12B. As the flow rate increases, more ink flows into the sub flow path 142 as illustrated in FIG. 12C. In a case where the ink in the sub flow path 142 joins the ink in the main flow path 141, the ink flowing in the sub flow path 142 joins in the direction that hinders the flow of ink in the main flow path 141 at the confluence portion 143. Accordingly, the ink in the sub flow path 142 that joins the ink in the main flow path 141 acts as flow resistance against the ink flowing in the main flow path 141. As the flow rate further increases, the amount of ink flowing into the sub flow path 142 also increases, and accordingly, the flow resistance received by the ink flowing in the main flow path 141 also increases. At this time, a vortex 211 of ink is generated in the confluence portion 143. Accordingly, the pressure loss in the second communication flow path 140 is further increased. As described above, in the second communication flow path 140 having the shape illustrated in FIGS. 12A to 12C, the pressure loss increases exponentially as the ink flow rate increases.

The second communication flow path 140 illustrated in FIGS. 12A to 12C is further desirably a Tesla valve configured to allow a liquid flow in a direction from the first liquid chamber 110 to the second liquid chamber 120 and to conversely hinder a liquid flow from the second liquid chamber 120 to the first liquid chamber 110. In this case, a difference in the pressure loss in the second communication flow path 140 between filling and recording can be further increased, and the effect of the present embodiment, i.e., the reduction of the waste ink amount in filling and the suppression of blurring in recording can be obtained more.

Figure 13A:
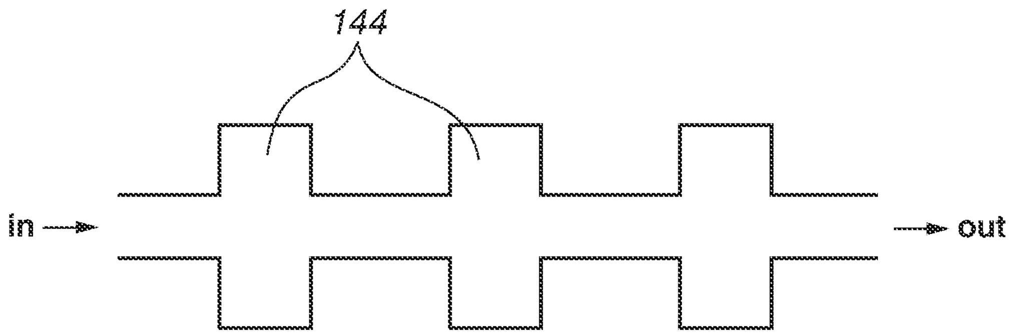
FIGS. 13A to 13C are diagrams illustrating another example of the second communication flow path according to the embodiment.
Figure 13B:
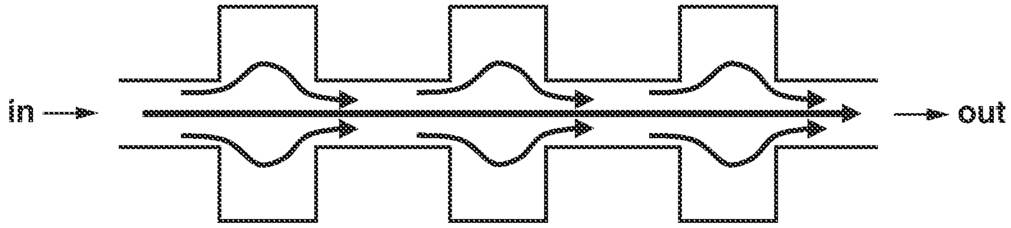
Figure 13C:
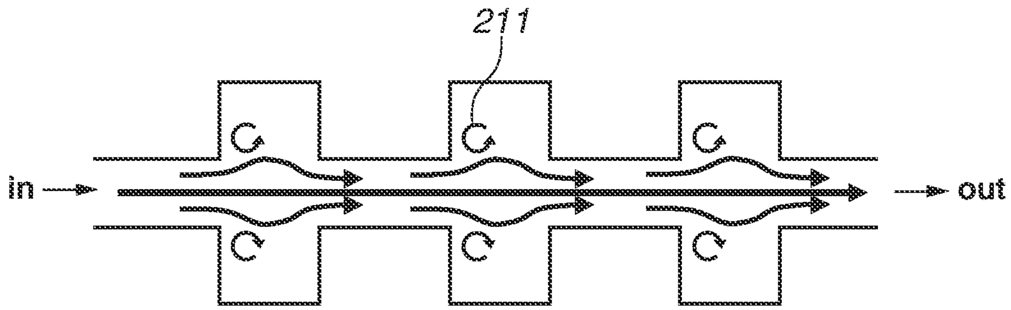
Figure 14A:
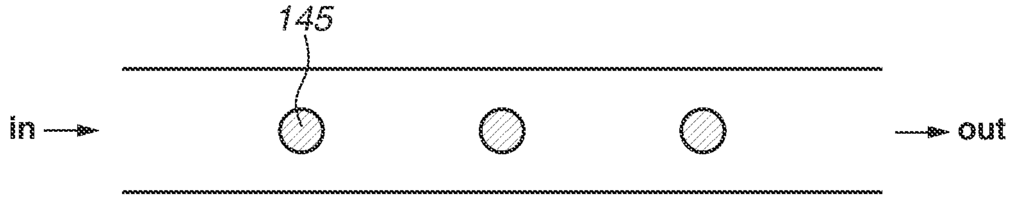
FIGS. 14A to 14C are diagrams illustrating yet another example of the second communication flow path according to the embodiment.
Figure 14B:
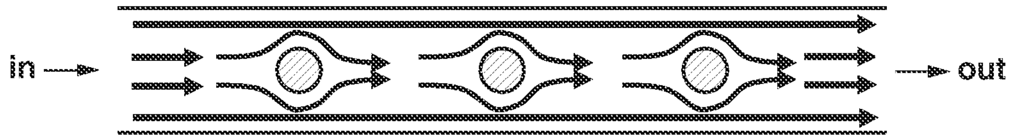
Figure 14C:
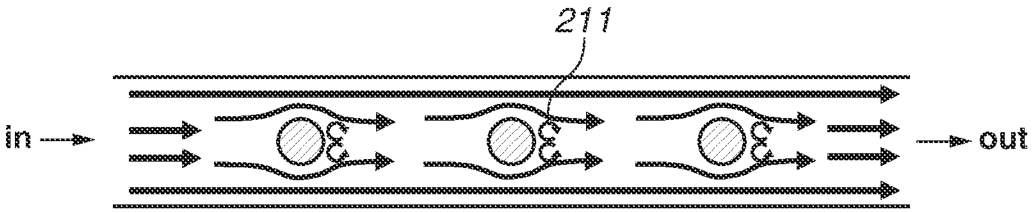

As another example of the shape of the second communication flow path 140 in which the rate of the pressure loss increases as the flow rate of the liquid flowing inside the second communication flow path 140 increases, there is a shape with two or more consecutive changes where a flow path width is expanded and contracted, resulting in changes in cross sectional area of the flow path. More specifically, a flow path having a shape including a plurality of expansion portions 144 each having a wide flow path width as illustrated in FIGS. 13A to 13C or a flow path having a shape including obstacles 145 in the flow path as illustrated in FIGS. 14A to 14C can be used. FIGS. 13B and 14B are schematic diagrams illustrating ink flows in a case where the ink flows in the second communication flow path 140 at the recording flow rate. Since the ink flow rate is relatively small, the ink flows while largely changing the flow width in the expansion portions 144 in FIG. 13B. In FIG. 14B, the ink flows around behind the obstacles 145. FIGS. 13C and 14C are schematic diagrams illustrating ink flows in a case where the ink flows in the second communication flow path 140 at the filling flow rate. Since the ink flow rate is relatively large, the vortex 211 of ink is generated in each expansion portion 144 in FIG. 13C. The vortex 211 prevents the ink from flowing while expanding the flow width in the expansion portions 144, and thus the pressure loss increases due to narrowing of an actual flow path width. In FIG. 14C, the vortex 211 is generated on a downstream side of each obstacle 145 in the ink flow direction. Accordingly, the pressure loss increases due to narrowing of the actual flow path width. The vortex 211, which is generated with the increase in flow rate and contributes to the increase in pressure loss, increases as the ink flow rate increases. Thus, the pressure loss in the second communication flow path 140 increases as the flow rate of ink flowing in the second communication flow path 140 increases, and the rate of the pressure loss also increases as the flow rate of ink increases. In the shape including the plurality of expansion portions 144 each having a wide flow path width as illustrated in FIGS. 13A to 13C, the number of the expansion portions 144 is desirably two or more, and more desirably three or more. Further, in the shape including the obstacles 145 in the flow path as illustrated in FIGS. 14A to 14C, the number of the obstacles 145 is desirably two or more, and more desirably three or more.

In the second communication flow path 140 having the shape illustrated in each of FIGS. 12A, 13A, and 14A described above, in a case where the ink flow rate is 10 ml/min or less, the vortex 211 is not generated in the second communication flow path 140 (see FIGS. 12B, 13B, and 14B), and in a case where the flow rate is 40 ml/min or more, the vortex 211 is generated in the second communication flow path 140 (see FIGS. 12C, 13C, and 14C). Thus, it is desirable to configure the liquid ejection apparatus so that the recording flow rate is 10 ml/min or less and the filling flow rate is 40 ml/min or more.

Figure 15:
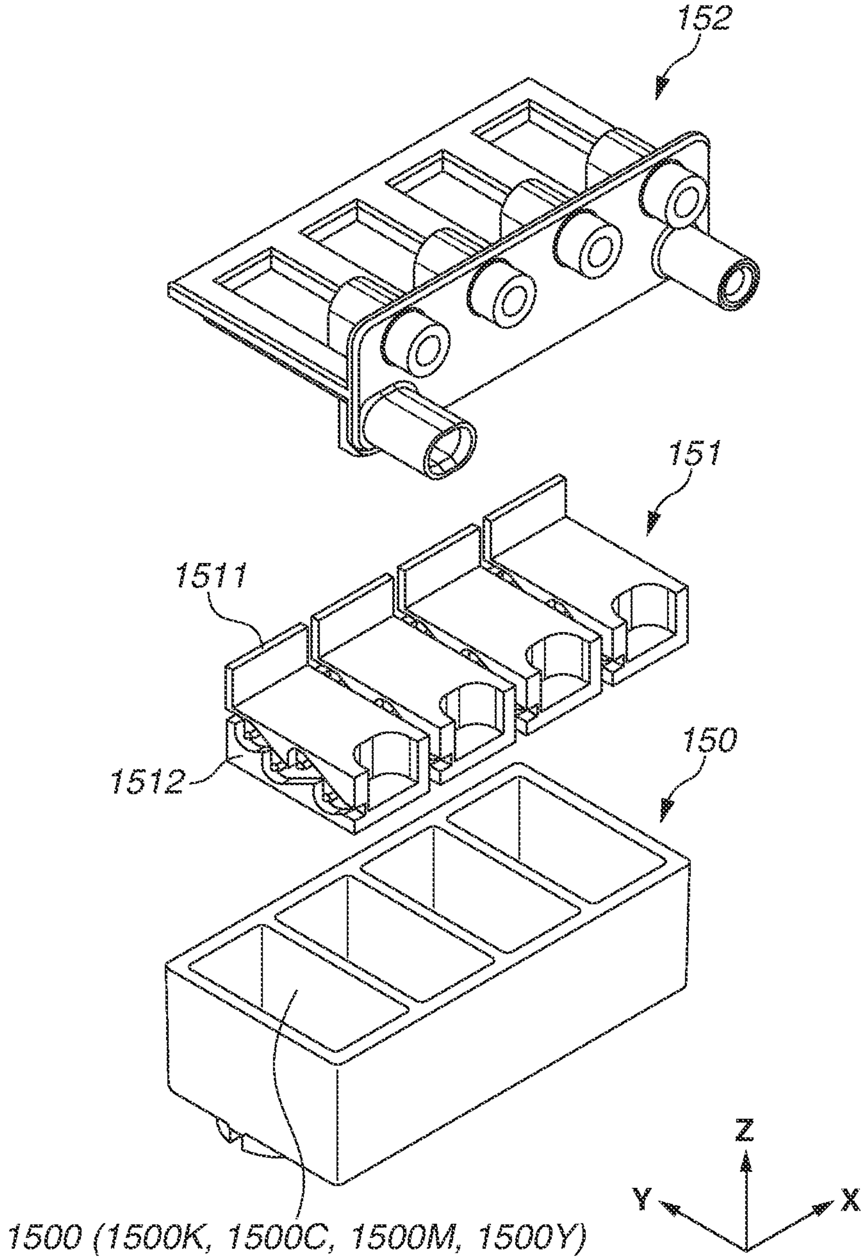
FIG. 15 is an exploded perspective diagram illustrating an example of the reservoir according to the embodiment.

Next, a method for manufacturing the reservoir 100 according to the present embodiment will be described. FIG. 15 is an exploded perspective diagram of the reservoir 100. As described above, the reservoir 100 according to the present embodiment desirably has the configuration in which the second liquid chamber 120 and the second communication flow path 140 overlap each other in the horizontal direction. Thus, the reservoir 100 is formed by arranging a flow path member 151 in substantially rectangular parallelepiped spaces (spaces 1500) included in a box-shaped member 150 and sealing an upper portion thereof with a lid member 152. In FIG. 15, the box-shaped member 150 includes four spaces 1500 (1500K, 1500C, 1500M, and 1500Y) storing four types of ink (black, cyan, magenta, and yellow) as an example. As illustrated in FIG. 15, the flow path member 151 divides each of the spaces 1500 into two as the first liquid chamber 110 and the second liquid chamber 120 (see FIG. 6B). The flow path member 151 further forms the first communication flow path 130 as a space between a flow path member protrusion portion 1511 and an inner wall of the box-shaped member 150 in a +Y direction. In addition, a groove for forming the second communication flow path 140 is formed on a flow path member side wall 1512 of the flow path member 151, and the second communication flow path 140 is formed by covering the groove with an inner wall of the box-shaped member 150 in a −X direction. The reservoir 100 has the configuration formed as described above, whereby it is possible to form the reservoir 100 compactly while reducing the number of components.

With the above-described configuration, there is provided a liquid ejection apparatus that achieves both the reduction of a waste ink amount in liquid filling and the suppression of blurring in recording.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-151393, filed Sep. 22, 2022 and Japanese Patent Application No. 2023-104674, filed Jun. 27, 2023, each of which is hereby incorporated by reference herein in its entirety.

What is claimed is:

1. A liquid ejection apparatus comprising:
- an ejection head configured to eject a liquid;
- a container configured to store the liquid; and
- a reservoir configured to supply the liquid to the ejection head and to store the liquid supplied from the container,
- wherein the reservoir includes a first liquid chamber configured to store the liquid, a second liquid chamber configured to store the liquid and arranged on a downstream side of the first liquid chamber, the downstream side being closer to the ejection head, and a first communication flow path and a second communication flow path that communicate the first liquid chamber and the second liquid chamber with each other,
- wherein a communication port between the first liquid chamber and the second communication flow path is located lower than a communication port between the first liquid chamber and the first communication flow path in a usage posture of the liquid ejection apparatus, and
- wherein the second communication flow path is configured so that a rate of a pressure loss increases as a flow rate of the liquid flowing inside the second communication flow path increases.

2. The liquid ejection apparatus according to claim 1, wherein the second communication flow path includes a Tesla valve.

3. The liquid ejection apparatus according to claim 1, wherein the second communication flow path extends in a first orthogonal direction to a liquid ejection direction.

4. The liquid ejection apparatus according to claim 3, wherein the second liquid chamber and the second communication flow path are arranged side by side in a second orthogonal direction orthogonal to the first orthogonal direction and orthogonal to the liquid ejection direction.

5. The liquid ejection apparatus according to claim 1, wherein the reservoir further includes:
- a box-shaped member having a rectangular parallelepiped space, and
- a member arranged in the rectangular parallelepiped space of the box-shaped member and dividing the rectangular parallelepiped space into the first liquid chamber, the second liquid chamber, the first communication flow path, and the second communication flow path.

6. The liquid ejection apparatus according to claim 1, wherein the container includes a replenishment port through which the container can be directly replenished with the liquid.

7. The liquid ejection apparatus according to claim 1, further comprising a supply path configured to supply the liquid from the container to the ejection head.

8. The liquid ejection apparatus according to claim 7, wherein the supply path includes a tube.

9. The liquid ejection apparatus according to claim 1, wherein the reservoir is configured to move in a predetermined direction together with the ejection head.

10. The liquid ejection apparatus according to claim 1, further comprising a pump,
- wherein the reservoir is filled with liquid by the pump performing a suction operation for the ejection head.

11. The liquid ejection apparatus according to claim 10, wherein a flow rate of the liquid in the second communication flow path in filling the reservoir with the liquid by the pump is greater than a flow rate of the liquid in the second communication flow path injecting from the ejecting head.

12. The liquid ejection apparatus according to claim 11, wherein a magnitude ratio of a pressure loss in the second communication flow path in the filling to a pressure loss in the second communication flow path in the ejecting is eight times or more.

13. A liquid ejection apparatus comprising:
- an ejection head configured to eject a liquid;
- a container configured to store the liquid; and
- a reservoir configured to supply the liquid to the ejection head and to store the liquid supplied from the container,
- wherein the reservoir includes a first liquid chamber configured to store the liquid, a second liquid chamber configured to store the liquid and arranged on a downstream side of the first liquid chamber, the downstream side being closer to the ejection head, and a first communication flow path and a second communication flow path that communicate the first liquid chamber and the second liquid chamber with each other,
- wherein a communication port between the first liquid chamber and the second communication flow path is located lower than a communication port between the first liquid chamber and the first communication flow path in a usage posture of the liquid ejection apparatus,
- wherein the second communication flow path includes a main flow path and a sub flow path that branches from the main flow path and then joins the main flow path on a downstream side in a liquid flow direction, and
- wherein, at a portion where the sub flow path joins the main flow path, the sub flow path is connected to the main flow path in a direction that causes a resistance to a flow of the liquid in the main flow path.

14. The liquid ejection apparatus according to claim 13, wherein the sub flow path is connected to the main flow path in a direction perpendicular to the main flow path.

15. A liquid ejection apparatus comprising:
- an ejection head configured to eject a liquid;
- a container configured to store the liquid; and a reservoir configured to supply the liquid to the ejection head and to store the liquid supplied from the container, wherein the reservoir includes a first liquid chamber configured to store the liquid, a second liquid chamber configured to store the liquid and arranged on a downstream side of the first liquid chamber, the downstream side being closer to the ejection head, and a first communication flow path and a second communication flow path that communicate the first liquid chamber and the second liquid chamber with each other, wherein a communication port between the first liquid chamber and the second communication flow path is located lower than a communication port between the first liquid chamber and the first communication flow path in a usage posture of the liquid ejection apparatus, and wherein the second communication flow path has two or more consecutive changes where a flow path cross sectional area is expanded and contracted.

16. The liquid ejection apparatus according to claim 15, wherein the second communication flow path includes a plurality of expansion portions where the flow path cross sectional area is expanded.

17. The liquid ejection apparatus according to claim 15, wherein the second communication flow path includes therein a structure for obstructing a liquid flow.

* * * * *